United States Patent
Kramer et al.

(10) Patent No.: US 7,932,322 B2
(45) Date of Patent: Apr. 26, 2011

(54) AMIDE OR THIOESTER PRE-EXTENDED EPOXY-TERMINATED VISCOSIFIERS AND METHOD FOR PRODUCING THE SAME

(75) Inventors: Andreas Kramer, Zürich (CH); Jan Olaf Schulenburg, Zürich (CH); Jürgen Finter, Zürich (CH); Norman Blank, Rüschlikon (CH)

(73) Assignee: Sika Technology AG, Baar (CH)

( * ) Notice: Subject to any disclaimer, the term of this patent is extended or adjusted under 35 U.S.C. 154(b) by 19 days.

(21) Appl. No.: 12/448,484

(22) PCT Filed: Dec. 21, 2007

(86) PCT No.: PCT/EP2007/064436
§ 371 (c)(1),
(2), (4) Date: Nov. 23, 2009

(87) PCT Pub. No.: WO2008/077935
PCT Pub. Date: Jul. 3, 2008

(65) Prior Publication Data
US 2010/0184924 A1    Jul. 22, 2010

(30) Foreign Application Priority Data

Dec. 22, 2006 (EP) .................. 06127082

(51) Int. Cl.
*C08L 9/02* (2006.01)
*C08L 63/00* (2006.01)
*C08L 63/02* (2006.01)
(52) U.S. Cl. ........ 525/119; 525/111; 525/113; 525/528; 525/531
(58) Field of Classification Search ......... None
See application file for complete search history.

(56) References Cited

U.S. PATENT DOCUMENTS

| 3,823,107 | A | * | 7/1974 | Cotton | 524/384 |
| 5,073,601 | A | | 12/1991 | Mülhaupt et al. | |
| 2006/0105164 | A1 | * | 5/2006 | Namikawa et al. | 428/343 |
| 2007/0105983 | A1 | | 5/2007 | Kramer et al. | |

FOREIGN PATENT DOCUMENTS

| EP | 0 353 190 A2 | 1/1990 |
| EP | 1 431 325 A1 | 6/2004 |
| EP | 1 602 702 A1 | 12/2005 |

OTHER PUBLICATIONS

Riew, "Amine Terminated Reactive Liquid Polymers; Modification of Thermoset Resins," *Rubber Chemistry and Technology*, vol. 54, No. 2, pp. 374-402, 1981.

* cited by examiner

*Primary Examiner* — Robert Sellers
(74) *Attorney, Agent, or Firm* — Oliff & Berridge PLC

(57) ABSTRACT

The invention relates to viscosifiers, especially terminated polymers that have functional terminal groups, said polymers being pre-extended by polyamines, polymercaptans, (poly) aminoalcohols, (poly)mercaptoalcohols or (poly)aminomercaptans and being reacted to give polymers that are terminated by other functional groups. The viscosifiers have a low content in educts or educt descendants that deteriorate the properties of compositions. They are also charaterized in that the formation of high-molecular addition products is considerably reduced or even excluded so that products obtained have low viscosity and good storage stability. The epoxy-terminated polymer of formula (I) is especially preferred.

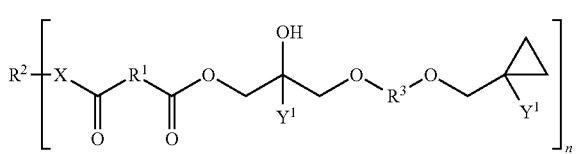

24 Claims, No Drawings

AMIDE OR THIOESTER PRE-EXTENDED EPOXY-TERMINATED VISCOSIFIERS AND METHOD FOR PRODUCING THE SAME

TECHNICAL FIELD

The invention relates to the field of toughness improvers.

STATE OF THE ART

Polymers have been used as materials for some time. Some polymers, however, have the problem that the polymer matrix fractures on abrupt impact stress, i.e. their toughness is low. Especially polymer matrices based on epoxy resins are very firm but in many cases not very impact-resistant. There have therefore long been attempts to improve the impact resistance.

This has been attempted for some time now, for example, with the use of specific copolymers, which are referred to as so-called liquid rubbers. By virtue of the use of chemically reactive groups, such as hydroxyl, carboxyl, vinyl or amino groups, such liquid rubbers can be incorporated chemically into the matrix. For example, there have for some time existed reactive liquid rubbers butadiene/acrylonitrile copolymers terminated by hydroxyl, carboxyl, vinyl or amino groups, which are supplied by B. F. Goodrich, or Noveon, under the Hycar® trade name. The starting basis used therefor is always the carboxyl-terminated butadiene/acrylonitrile copolymer, to which a large excess of a diamine, diepoxide or a glycidyl (meth)acrylate is typically added. However, this leads to the effect that, on the one hand, a high viscosity forms or, on the other hand, that a very high content of unconverted diamine, diepoxide or glycidyl (meth)acrylate, which either has to be removed in a complex manner or else significantly adversely affects the mechanical properties.

However, the desire in many cases is to obtain even further-enhanced impact resistance and to have a wider variety of toughness improvers. One such possibility in this direction consists in the chain extension of epoxy-terminated polymers by bisphenols or by the use of higher molecular weight epoxy resins in the preparation. Here too, according to the reaction regime, large amounts of unconverted bisphenols or of extended epoxy resins arise, both of which can quickly adversely affect the properties of compositions. Moreover, such adducts are rapidly no longer fluid, as a result of which compositions comprising such toughness improvers consequently can no longer be applied in a reliable process in many cases. In addition, the use of bisphenols leads to reduced storage stability.

SUMMARY OF THE INVENTION

It is therefore an object of the present invention to provide toughness improvers with functional end groups which are capable of alleviating the problems of the prior art. The polymers as claimed in claims 1, 10, 12 and 13 provide such polymers. They can all be prepared from a carboxyl-terminated polymer as claimed in claim 10, which in turn can be obtained from a readily obtainable carboxyl-terminated butadiene/acrylonitrile copolymer. The possibilities which arise from the different molecules for pre-extension and termination make possible a wide range of different toughness improvers, and allow tailoring to the requirements. The polymers terminated with functional groups have the great advantage that they have a narrow molecular weight distribution and a very high proportion of molecules suitable as toughness improvers.

This advantage arises especially through the process for preparing the carboxyl-terminated polymer as claimed in claim 10, which serves as a starting point for the preparation of the polymers as claimed in claims 1, 12 and 13, and especially through the process comprising two steps for preparing an end group-terminated polymer as claimed in claim 16. This process as claimed in claim 14 ensures that any unconverted reactants present are only substances which already act as toughness improvers, which likewise react to give reactive toughness improvers in any reaction step leading further to polymer as claimed in claim 1, 12 or 13. Therefore, only insignificant amounts, if any, of compounds which adversely affect the mechanical properties are formed, such that exceptionally potent toughness improvers can be provided. In spite of the many possibilities which arise from pre-extension and epoxy termination, the polymers have an astonishingly low viscosity.

The polymers as claimed in claims 1, 10, 12 and 13 can be used widely as means of increasing the impact resistance of a polymer matrix as claimed in claim 16. Particular preference is given to the use thereof in epoxy resin matrix.

Further aspects of the invention relate to compositions comprising polymers as claimed in claim 1, 10, 12 or 13, and to cured compositions as claimed in claims 22 and 23.

Particular preference is given to using such polymers in adhesives, especially heat-curing epoxy resin adhesives. They have exceptionally good impact resistances.

Preferred embodiments of the invention are the subject-matter of the dependent claims.

WAYS OF PERFORMING THE INVENTION

In a first aspect, the present invention relates to epoxy-terminated polymer of the formula (I).

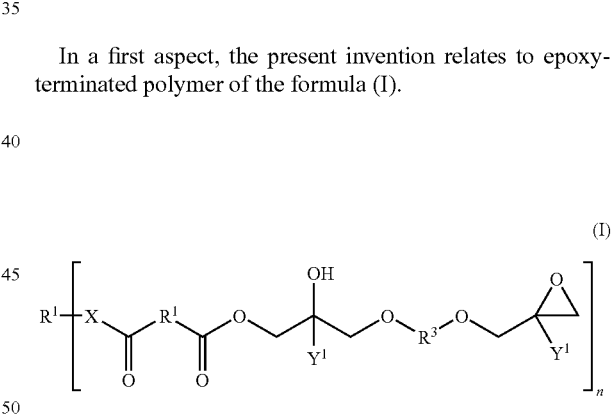

In this formula, $R^1$ is a divalent radical of a carboxyl-terminated butadiene/acrylonitrile copolymer CTBN after removal of the terminal carboxyl groups. In addition, $R^2$ is a radical of a compound XAV which has n XH groups and is selected from the group consisting of polyamines, polymercaptans, (poly)aminoalcohols, (poly)mercaptoalcohols and (poly)aminomercaptans, after removal of n XH groups. In addition, $Y^1$ is H or methyl. $R^3$ is a diglycidyl ether DGE after removal of the two glycidyl ether groups. X is independently S, NH or $NR^0$ or O, with the proviso that only one X in the molecule is O, where $R^0$ is an alkyl, cycloalkyl or aryl radical having 1 to 8 carbon atoms or a divalent radical, especially alkylene radical, which is joined to $R^2$. Finally, n is 2 to 4, especially 2.

In this context, "glycidyl ether group" is understood to mean the group of the formula

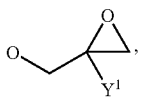

i.e., as well as the case in which $Y^1$ in this formula is H, for the sake of simplicity in the present document, this also refers to that group of the latter formula in which $Y^1$ is methyl.

The prefix "poly" in substance names such as "polyol", "polyamine" or "polymercaptan" in the present document indicates that the particular substance in a formal sense contains more than one of the functional groups which occur in its name per molecule.

More particularly, $R^1$ is a radical as obtained by formal removal of the carboxyl groups of a carboxyl-terminated butadiene/acrylonitrile copolymer CTBN sold commercially under the Hycar® CTBN name by Noveon. It preferably has a structure of the formula (IV).

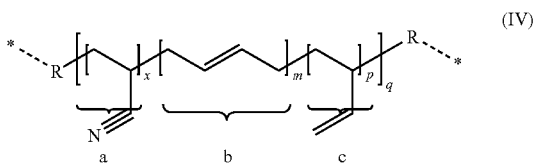

In this formula, the broken lines represent the attachment sites of the two carboxyl groups. R is a linear or branched alkylene radical having 1 to 6 carbon atoms, especially having 4 carbon atoms, which is optionally substituted by unsaturated groups. In an embodiment of which particular mention should be made, the substituent R is a substituent of the formula (VII), where the broken line here too represents the attachment sites.

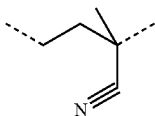

In addition, the index q is from 40 to 100, especially from 50 to 90. In addition, the labels b and c represent the structural elements which originate from butadiene, and a represents the structural element which originates from acrylonitrile. The indices x, m and p in turn represent values which describe the ratio of the structural elements a, b and c relative to one another. The index x represents values of 0.05-0.3, the index m values of 0.5-0.8, the index p values of 0.1-0.2, with the proviso that the sum of x, m and p is equal to 1.

It is clear to the person skilled in the art that the structures shown in formula (IV), and also the further structures shown in formulae (V'), (V''') and (VI'''), should be understood as simplified representations. The units a, b and c, or d and e or d' and e', may thus each be arranged randomly, alternately or blockwise with respect to one another. More particularly, formula (IV) is thus not necessarily a triblock copolymer.

The $R^2$ radical is a compound XAV which has n XH groups and is selected from the group consisting of polyamines, polymercaptans, (poly)aminoalcohols, (poly)mercaptoalcohols and (poly)aminomercaptans, after removal of n XH groups.

The compound XAV comprises diamines, triamines, tetramines, dimercaptans, trimercaptans, tetramercaptans, and also (poly)aminoalcohols, (poly)aminomercaptans and (poly)mercaptoalcohols. This means that the compound XAV which has n XH groups also includes compounds which simultaneously have SH and/or OH and/or amino groups. Examples of such compounds XAV which have n mixed XH groups, and as examples of (poly)aminoalcohols, (poly)mercaptoalcohols and (poly)aminomercaptans, are thioglycol, dithioglycerol, aminoethanol, 2-aminopropanol, 3-aminopropanol, 2-amino-2,2-dimethylethanol, 2-amino-1-methylethanol, 2-aminopropan-2-ol and aminoethanethiol.

In one embodiment, the compound XAV is a polyamine. Such polyamines are especially diamines or triamines, preferably aliphatic or cyclo-aliphatic diamines or triamines.

Examples of diamines are aliphatic diamines such as ethylenediamine, 1,2- and 1,3-propanediamine, 2-methyl-1,2-propanediamine, 2,2-dimethyl-1,3-propanediamine, 1,3- and 1,4-butanediamine, 1,3- and 1,5-pentanediamine, 1,6-hexanediamine, 2,2,4- and 2,4,4-trimethylhexamethylenediamine and mixtures thereof, 1,7-heptanediamine, 1,8-octanediamine, 1,9-nonanediamine, 1,10-decanediamine, 1,11-undecanediamine, 1,12-dodecanediamine, methylbis(3-aminopropyl)amine, 1,5-diamino-2-methylpentane (MPMD), 1,3-diaminopentane (DAMP), 2,5-dimethyl-1,6-hexamethylenediamine, cycloaliphatic polyamines such as 1,3- and 1,4-diaminocyclohexane, bis(4-aminocyclohexyl)methane, bis(4-amino-3-methylcyclohexyl)methane, bis(4-amino-3-ethylcyclohexyl)methane, 2-methylpentamethylenediamine, bis(4-amino-3,5-dimethylcyclohexyl)methane, 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis(aminomethyl)cyclohexane, 1-cyclohexylamino-3-aminopropane, 2,5(2,6)-bis(aminomethyl)-bicyclo[2.2.1]heptane (NBDA, produced by Mitsui Chemicals), 3(4),8(9)-bis(aminomethyl)tricyclo[5.2.1.0$^{2,6}$]decane, 1,4-diamino-2,2,6-trimethylcyclohexane (TMCDA), 3,9-bis(3-aminopropyl)-2,4,8,10-tetraoxaspiro[5.5]-undecane, piperazine, 1-(2-aminoethyl)piperazine, 1,3- and 1,4-xylylenediamine;

ether-containing aliphatic polyamines such as bis(2-aminoethyl)ether, 4,7-dioxadecane-1,10-diamine, 4,9-dioxadodecane-1,12-diamine and higher oligomers thereof, polyoxyalkylenepolyamines having two or three amino groups, for example obtainable under the Jeffamine® name (from Huntsman Chemicals), under the Polyetheramine name (from BASF) or under the PC Amine® name (from Nitroil), and mixtures of the aforementioned polyamines.

Such triamines are sold, for example, under the Jeffamine® T line from Huntsman Chemicals, for example Jeffamine® T-3000, Jeffamine® T-5000 or Jeffamine® T-403.

Preferred diamines are polyoxyalkylene polyamines with two amino groups of the formula (V').

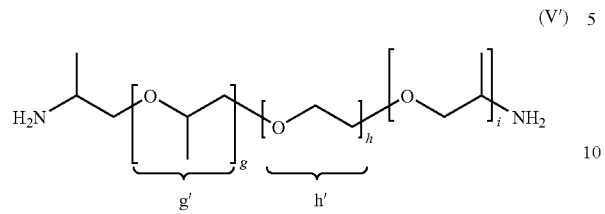

In this formula, g' is the structural element which originates from propylene oxide, and h' is the structural element which originates from ethylene oxide. In addition, g, h and i are each 0 to 40, with the proviso that the sum of g, h and i is $\geq 1$.

Especially preferred are molecular weights between 200 and 5000 g/mol.

Especially preferred are Jeffamine® as supplied under the D line and ED line by Huntsman Chemicals, for example Jeffamine® D-230, Jeffamine® D-400, Jeffamine® D-2000, Jeffamine® D-4000, Jeffamine® ED-600, Jeffamine® ED-900, Jeffamine® ED-2003 or Jeffamine® EDR-148.

In a further embodiment, the compound XAV is a polymercaptan. Preferred polymercaptans are especially dimercaptans.

Suitable polymercaptans are, for example, polymercaptoacetates of polyols. These are especially polymercaptoacetates of the following polyols:

polyoxyalkylenepolyols, also known as polyetherpolyols, which are the polymerization products of ethylene oxide, 1,2-propylene oxide, 1,2- or 2,3-butylene oxide, tetrahydrofuran or mixtures thereof, optionally polymerized with the aid of a starter molecule having two or three active hydrogen atoms, for example water, or compounds having two or three OH groups. It is possible to use either polyoxyalkylenepolyols which have a low degree of unsaturation (measured to ASTM D-2849-69 and reported in milliequivalents of unsaturation per gram of polyol (meq/g)), prepared, for example, with the aid of so-called double metal cyanide complex catalysts (DMC catalysts for short), or polyoxyalkylenepolyols with a higher degree of unsaturation, prepared, for example, with the aid of anionic catalysts such as NaOH, KOH or alkali metal alkoxides. Particularly suitable substances are polyoxypropylenediols and -triols with a degree of unsaturation lower than 0.02 meq/g and with a molecular weight in the range of 300-20 000 daltons, polyoxybutylenediols and -triols, polyoxypropylenediols and -triols with a molecular weight of 400-8000 daltons, and so-called "EO-endcapped" (ethylene oxide-endcapped) polyoxypropylenediols or -triols. The latter are specific polyoxypropylenepolyoxyethylenepolyols which are obtained, for example, by alkoxylating pure polyoxypropylenepolyols with ethylene oxide on completion of the polypropoxylation, and which thus have primary hydroxyl groups;

hydroxyl-terminated polybutadienepolyols, for example those which are prepared by polymerizing 1,3-butadiene and allyl alcohol or by oxidizing polybutadiene, and the hydrogenation products thereof;

styrene-acrylonitrile-grafted polyetherpolyols, as supplied, for example, by Elastogran under the Lupranol® name;

polyesterpolyols, prepared, for example, from di- to trihydric alcohols, for example 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or the anhydrides or esters thereof, for example succinic acid, glutaric acid, adipic acid, suberic acid, sebacic acid, dodecanedicarboxylic acid, maleic acid, fumaric acid, phthalic acid, isophthalic acid, terephthalic acid and hexahydrophthalic acid, or mixtures of the aforementioned acids, and polyesterpolyols formed from lactones, for example ε-caprolactone;

polycarbonatepolyols, as obtainable by reacting, for example, the abovementioned alcohols used to form the polyesterpolyols with dialkyl carbonates, diaryl carbonates or phosgene;

1,2-ethanediol, diethylene glycol, 1,2-propanediol, dipropylene glycol, 1,4-butanediol, 1,5-pentanediol, 1,6-hexanediol, 1,7-heptanediol, octanediol, nonanediol, decanediol, neopentyl glycol, pentaerythritol (=2,2-bis-(hydroxymethyl)-1,3-propanediol), dipentaerythritol (=3-(3-hydroxy-2,2-bishydroxymethylpropoxy)-2,2-bishydroxymethylpropan-1-ol), glycerol (=1,2,3-propanetriol), trimethylolpropane (=2-ethyl-2-(hydroxymethyl)-1,3-propanediol), trimethylolethane (=2-(hydroxymethyl)-2-methyl-1,3-propanediol), di(trimethylolpropane) (=3-(2,2-bis(hydroxymethyl) butoxy)-2-ethyl-2-hydroxymethylpropan-1-ol), di(trimethylolethane) (=3-(3-hydroxy-2-hydroxymethyl-2-methylpropoxy)-2-hydroxymethyl-2-methylpropan-1-ol), diglycerol (=bis(2,3-dihydroxypropyl)ether;

polyols as contained by reduction of dimerized fatty acids.

Especially preferred are glycol dimercaptoacetate, trimethylolpropane trimercaptoacetate and butanediol dimercaptoacetate.

The most preferred polymercaptans are considered to be dimercaptans of the formula (V").

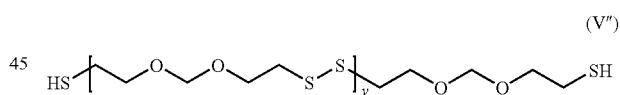

In this formula, y is 1 to 45, especially 5 to 23. The preferred molecular weights are between 800 and 7500 g/mol, especially between 1000 and 4000 g/mol.

Such polymercaptans are commercially available under the Thiokol® LP series from Toray Fine Chemicals Co.

The $R^3$ radical is a diglycidyl ether DGE after removal of the two glycidyl ether groups.

In one embodiment, the diglycidyl ether DGE is an aliphatic or cycloaliphatic diglycidyl ether, especially a diglycidyl ether of difunctional saturated or unsaturated, branched or unbranched, cyclic or open-chain $C_2$-$C_{30}$ alcohols, e.g. ethylene glycol diglycidyl ether, butanediol diglycidyl ether, hexanediol diglycidyl ether, octanediol diglycidyl ether, cyclohexanedimethanol diglycidyl ether, neopentyl glycol diglycidyl ether.

More particularly, the diglycidyl ether DGE is firstly an aliphatic or cycloaliphatic diglycidyl ether, especially a diglycidyl ether of the formula (VI") or (VI''').

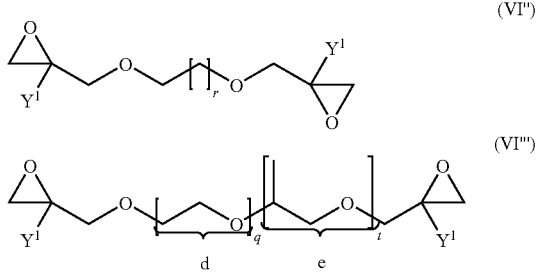

In these formulae, r is 1 to 9, especially 3 or 5. In addition, q is 0 to 10 and t is 0 to 10, with the proviso that the sum of q and t is ≧1. Finally, d is the structural element which originates from ethylene oxide, and e is the structural element which originates from propylene oxide. Formula (VI''') is thus (poly)ethylene glycol diglycidyl ether, (poly)propylene glycol diglycidyl ether and (poly)ethylene glycol/propylene glycol diglycidyl ether, where the units d and e may be arranged in blocks, alternately or randomly.

Particularly suitable aliphatic or cycloaliphatic diglycidyl ethers are ethylene glycol diglycidyl ether, butanediol diglycidyl ether or hexanediol diglycidyl ether.

In a further embodiment, the diglycidyl ether DGE is an epoxy resin. The epoxy resin may be a liquid epoxy resin or a solid epoxy resin.

The term "solid epoxy resin" is very well known to the person skilled in the art of epoxides and is used in contrast to "liquid epoxy resins". The glass transition temperature of solid resins is above room temperature, i.e. they can be comminuted to free-flowing powders at room temperature.

Preferred solid epoxy resins have the formula (VIII).

In this formula, the substituents $R^4$, $R^5$ and $Y^2$ are each independently H or $CH_3$. In addition, the index S1 is >1.5, especially 2 to 12.

In this document, the use of the term "independently" in connection with substituents, radicals or groups should be interpreted such that substituents, radicals or groups with the same designation may occur simultaneously in the same molecule with different definitions.

Such solid epoxy resins are commercially available, for example from Dow, Huntsman or Hexion.

Compounds of the formula (VIII) with an index S1 between 1 and 1.5 are referred to by the person skilled in the art as semisolid epoxy resins. For this present invention, they are likewise considered to be solid resins. However, preferred solid epoxy resins are solid epoxy resins in the narrower sense, i.e. the index S1 has a value of >1.5.

Preferred liquid epoxy resins have the formula (IX).

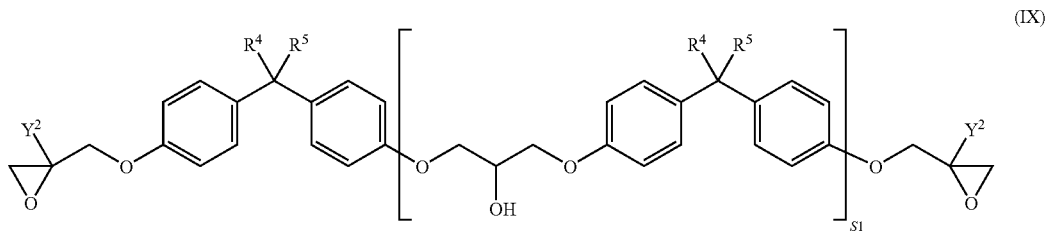

In this formula, the substituents $R^4$, $R^5$ and $Y^2$ are each independently H or $CH_3$. In addition, the index S1 has a value of 0 to 1. S1 preferably has a value of less than 0.2.

These are thus preferably diglycidyl ethers of bisphenol A (DGEBA), of bisphenol F and of bisphenol NF (the designation "A/F" refers here to a mixture of acetone with formaldehyde which is used as the reactant in the preparation thereof). Such liquid resins are available, for example, as Araldite®GY 250, Araldite® PY 304, Araldite® GY 282 (Huntsman) or D.E.R.™ 331 or D.E.R.™ 330 (Dow) or Epikote 828 (Hexion).

In addition, the diglycidyl ether DGE may be an epoxidized Novolac.

In a further particularly preferred embodiment, the diglycidyl ether DGE is a diglycidyl ether which, after removal of the two glycidyl ether groups corresponding to the $R^3$ radical, has the formula (VI) or (VI').

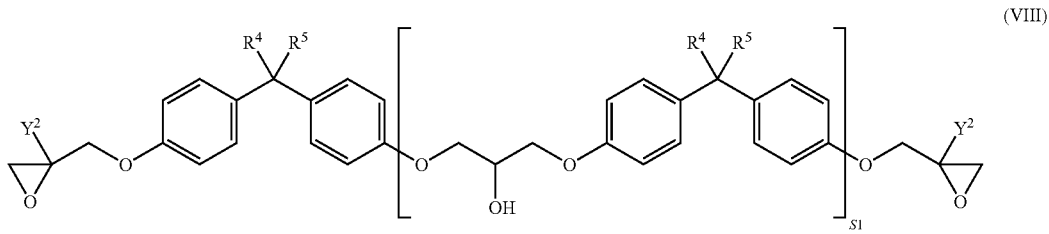

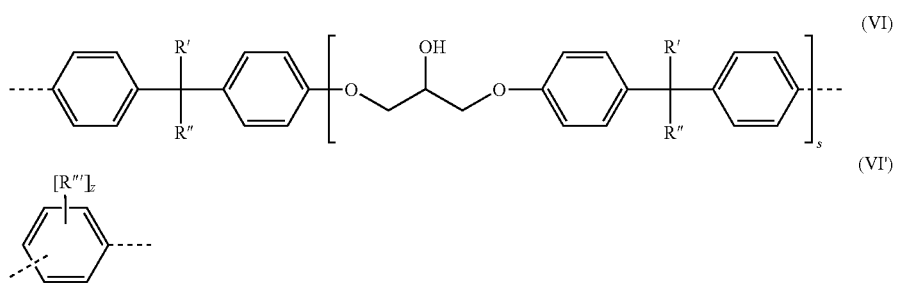

In these formulae, R', R" and R'" are each independently H, methyl or ethyl, z is 0 or 1 and s is 0 or 0.1-12.

A particularly preferred diglycidyl ether DGE is bisphenol F diglycidyl ether.

The epoxy-terminated polymer of the formula (I) can be prepared as follows:

In a first step ("pre-extension"), a carboxyl-terminated butadiene/acrylonitrile copolymer CTBN of the formula HOOC—$R^1$—COOH and a compound XAV having XH groups are used in a stoichiometric ratio (n'≧n) of the HOOC—$R^1$—COOH to prepare a carboxyl-terminated polymer of the formula (II):

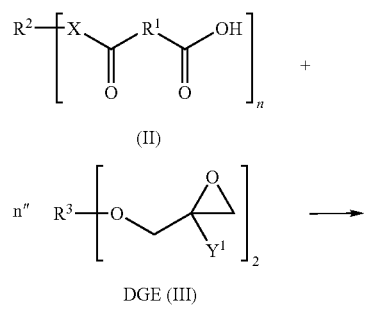

For this reaction, compound XAV having XH groups and HOOC—$R^1$—COOH are used in an amount such that the stoichiometric ratio of the COOH groups to XH groups [COOH]/[XH] is ≧2.

When this ratio=2, corresponding to n'=n, the trend is toward an increased proportion of higher molecular weight species, which can lead to significantly increased viscosities in the carboxyl-terminated polymer of the formula (II), or in the epoxy-terminated polymer of the formula (I), which can cause problems under some circumstances. At a ratio of <2 (corresponding to n'<n), especially of <<2, this problem is very significantly enhanced. Therefore, a value of >2 is preferred for this ratio. Typically, a value of >4, in particular >>2, corresponding to n'>>n, is very preferred. In these cases, the reaction mixture has a relatively high content of unconverted HOOC—$R^1$—COOH. However, this does not cause any further problems, as discussed below.

It is clear to the person skilled in the art that it is also possible to use mixtures of compounds XAV having XH groups and/or carboxyl-terminated butadiene/acrylonitrile copolymers CTBN of the formula HOOC—$R^1$—COOH.

In a second step ("termination"), the carboxyl-terminated polymer of the formula (II) and a diglycidyl ether DGE of the formula (III) are used in a stoichiometric excess (n"≧n) of the diglycidyl ether DGE to prepare an epoxy-terminated polymer of the formula (I):

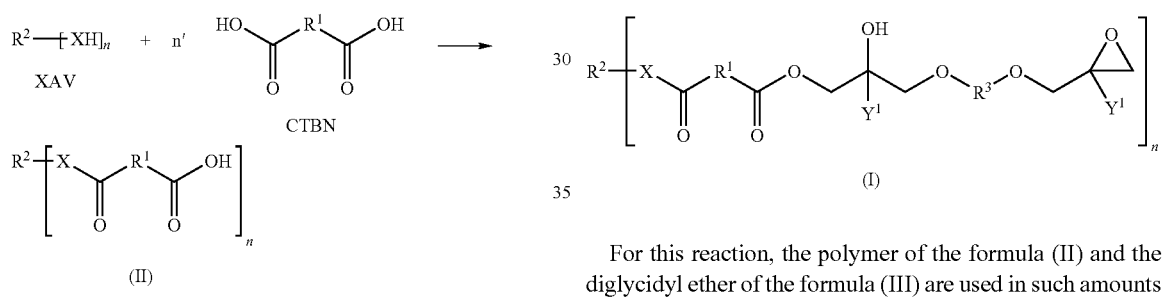

For this reaction, the polymer of the formula (II) and the diglycidyl ether of the formula (III) are used in such amounts relative to one another that the stoichiometric ratio of the glycidyl ether groups to COOH groups

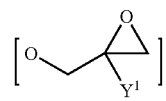

[COOH] is ≧2.

When this ratio=2, corresponding to n"=n, the proportion of higher molecular weight species is increased, which can lead to significantly increased viscosities in the epoxy-terminated polymer of the formula (I), which can cause problems under some circumstances. At a ratio of <2 (corresponding to n'<n), especially of <<2, this problem is very greatly enhanced. Therefore, preference is given to a value of >2 for this ratio. Typically, a value of >4, in particular >>2, corresponding to n">>n, is very preferred.

If unconverted carboxyl-terminated butadiene/acrylonitrile copolymer CTBN HOOC—$R^1$—COOH from the first step is still present in the reactant mixture at the start of this second step, it is reacted in the second step to give an epoxy-terminated polymer of the formula (X) known from the prior art.

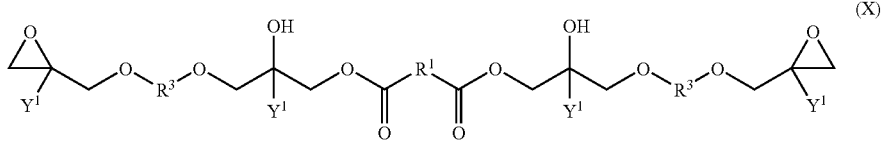

In this manner, it can be ensured that a maximum number of epoxy-terminated polymers which can be used as impact modifiers are present in the final mixture. More particularly, in contrast to the prior art process, the presence of a large molecular weight distribution is prevented, which leads to a deterioration in the application properties, especially a high viscosity.

It is clear to the person skilled in the art that it is also possible to use mixtures of carboxyl-terminated polymers of the formula (II) and/or diglycidyl ethers DGE of the formula (III). In such a mode of preparation, mixtures of epoxy-terminated polymers of the formula (I) form in situ.

In the first step, an ester, amide or thioester is formed, while an ester is formed in the second step.

Such reactions of alcohol, amine or mercaptan with carboxylic acids, or of glycidyl ethers with carboxylic acids, are known to those skilled in the art, as are the reaction conditions therefor. More particularly, this reaction can be effected at elevated temperature and optionally under the influence of catalysts.

For amide formation, especially high temperatures and titanate catalysts such as n-butyl titanate are preferred. The water formed in the esterification can be removed from the reaction mixture under atmospheric pressure or else under reduced pressure. It is also possible to conduct a gas stream over or through the reaction mixture. The gas stream used may, for example, be air or nitrogen.

The esterification of a poly(aminoalcohol) or poly(mercaptoalcohol) with the carboxyl-terminated butadiene/acrylonitrile copolymer CTBN is effected preferably at elevated temperature and especially under the influence of an esterification catalyst, especially of an acid. Such an acid is preferably sulfuric acid, p-toluenesulfonic acid, benzenesulfonic acid, methanesulfonic acid, phosphoric acid or phosphorous acid. Preference is given to sulfuric acid. The water formed in the esterification can be removed from the reaction mixture under atmospheric pressure or else under reduced pressure. It is also possible to conduct a gas stream over or through the reaction mixture. The gas stream used may, for example, be air or nitrogen.

The esterification of the diglycidyl ether DGE with the carboxyl-terminated polymer is effected preferably at elevated temperature, typically at temperatures of 100° C., preferably around 140° C., and optionally using catalysts and preferably under protective gas. Examples of such catalysts are triphenylphosphine, tertiary amines, quaternary phosphonium salts or quaternary ammonium salts.

Carboxyl-terminated polymers of the formula (II) thus form a further aspect of the present invention. The definition, options and preferred embodiments of the radicals and indices shown in this formula (II) correspond to those as have already been described above in detail for epoxy-terminated polymer of the formula (I).

A further aspect of the present invention is a process for preparing a carboxyl-terminated polymer of the formula (II) by a reaction of a compound XAV having XH groups of the formula $R^2(XH)_n$ with a carboxyl-terminated butadiene/acrylonitrile copolymer CTBN of the formula HOOC—$R^1$—COOH, characterized in that $R^2(XH)_n$ and HOOC—$R^1$—COOH are used for this reaction in an amount relative to one another which corresponds to a stoichiometric ratio of the COOH groups to XH groups [COOH]/[XH] of $\geq 2$. This process has already been described in detail above in this document.

A further aspect of the present invention is a process for preparing an epoxy-terminated polymer of the formula (I) by the reaction of a carboxyl-terminated polymer of the formula (II) with a diglycidyl ether DGE of the formula (III), characterized in that the polymer of the formula (II) and the diglycidyl ether of the formula (III) are used for this reaction in an amount relative to one another which corresponds to a stoichiometric ratio of the glycidyl ether groups to COOH groups

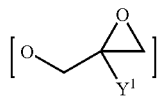

/[COOH] of $\geq 2$.

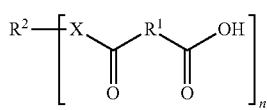

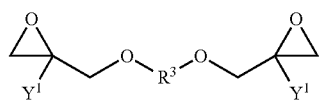

This process has already been described in detail above in this document.

It is clear to the person skilled in the art that the epoxy-terminated polymers of the formula (I) can be reacted further. For instance, more particularly, extension by means of polyphenols, especially by means of bisphenols, such as bisphenol A, is very helpful under some circumstances in order to obtain even higher molecular weight epoxy-terminated polymers or phenol-terminated polymers, as represented, for example, in the following formulae (XIII) and (XIV):

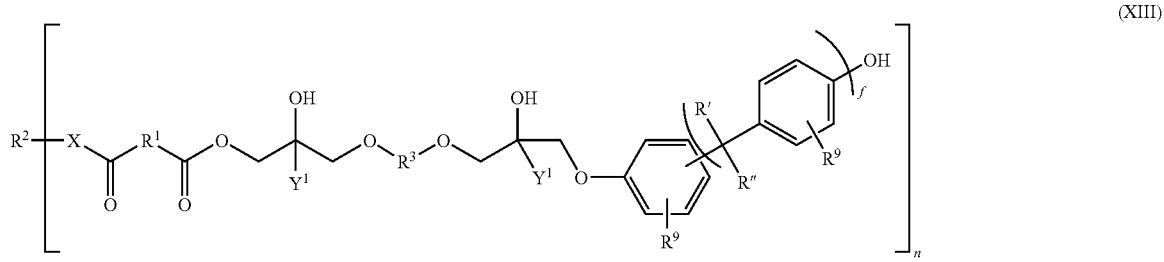

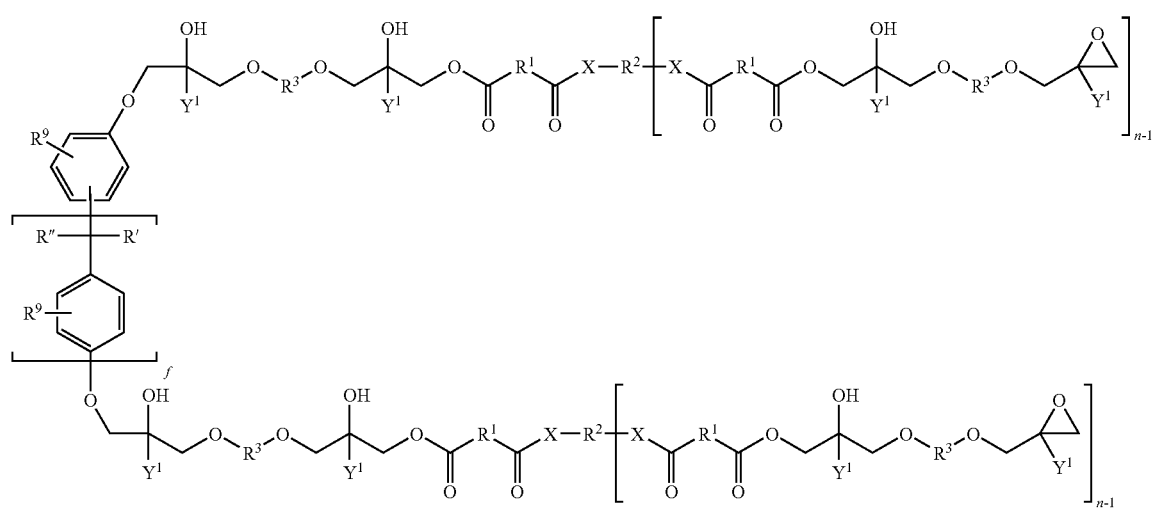

In these formulae, the index f is 0 or 1. $R^9$ here is H or an alkyl or alkenyl radical, especially an allyl radical.

Further aspects are reaction products formed from the carboxyl-terminated polymer of the formula (II) with diamines or (meth)acrylate-functional alcohols or glycidyl ether-functional (meth)acrylates, which lead especially to amine-terminated polymers of the formulae (XI), (XI') and (XI''), or to (meth)acrylate-terminated polymers of the formulae (XII) and (XII'), according to the following illustrative reaction scheme:

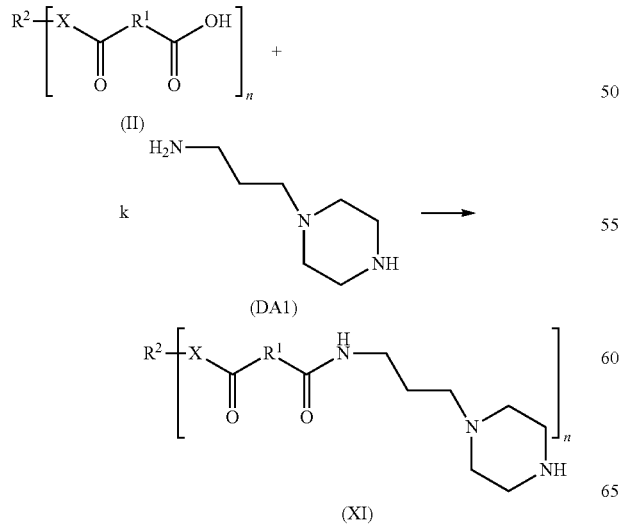

-continued

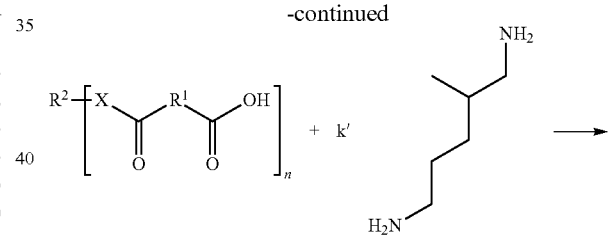

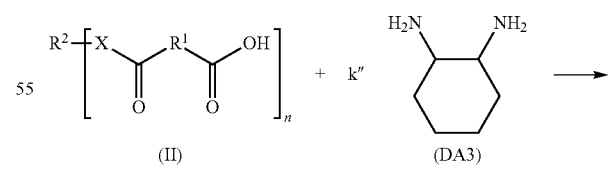

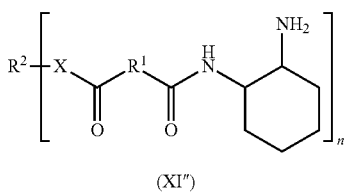

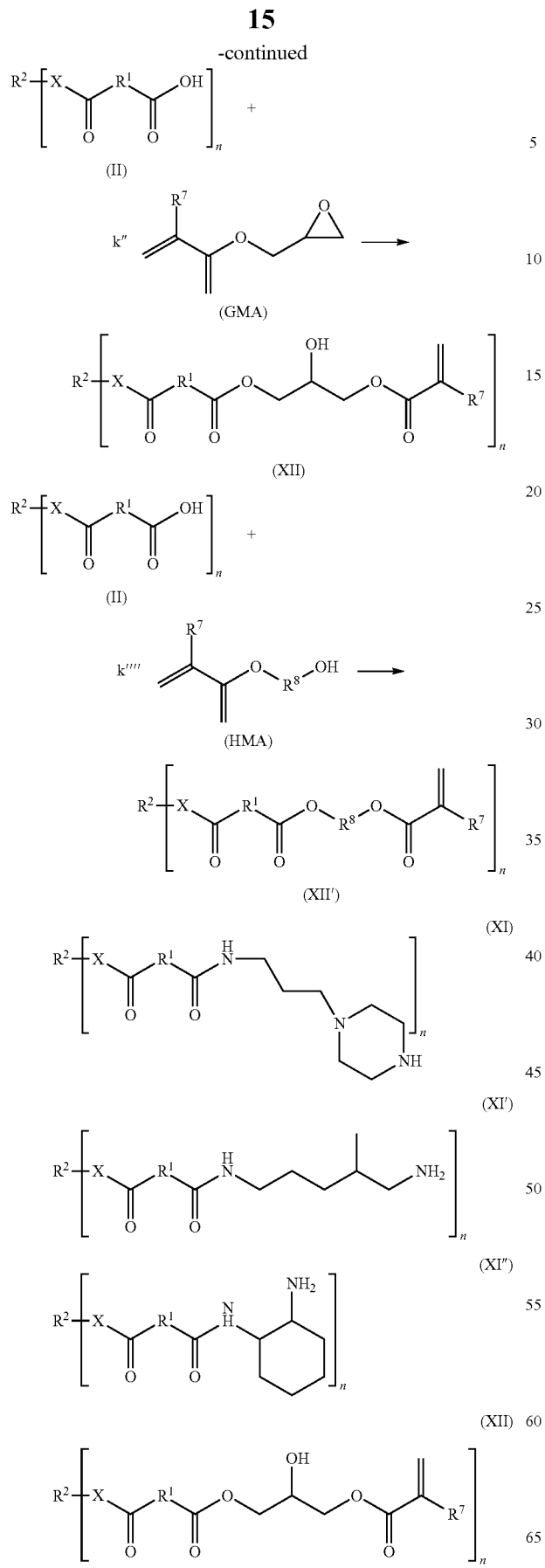

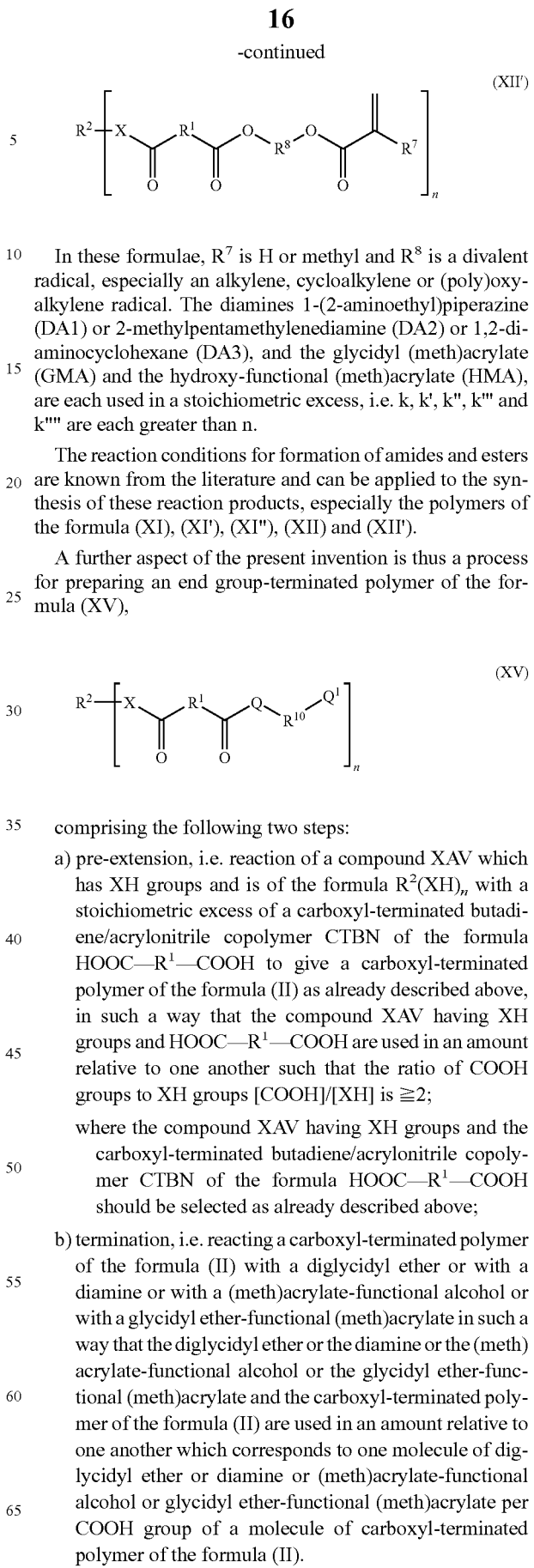

In these formulae, $R^7$ is H or methyl and $R^8$ is a divalent radical, especially an alkylene, cycloalkylene or (poly)oxyalkylene radical. The diamines 1-(2-aminoethyl)piperazine (DA1) or 2-methylpentamethylenediamine (DA2) or 1,2-diaminocyclohexane (DA3), and the glycidyl (meth)acrylate (GMA) and the hydroxy-functional (meth)acrylate (HMA), are each used in a stoichiometric excess, i.e. k, k', k'', k''' and k'''' are each greater than n.

The reaction conditions for formation of amides and esters are known from the literature and can be applied to the synthesis of these reaction products, especially the polymers of the formula (XI), (XI'), (XI''), (XII) and (XII').

A further aspect of the present invention is thus a process for preparing an end group-terminated polymer of the formula (XV), $$R^2 \mathord{-\!\!\!-} \left[ X \mathord{-\!\!\!-} \underset{O}{C} \mathord{-\!\!\!-} R^1 \mathord{-\!\!\!-} \underset{O}{C} \mathord{-\!\!\!-} Q \mathord{-\!\!\!-} R^{10} \mathord{-\!\!\!-} Q^1 \right]_n \qquad (XV)$$

comprising the following two steps:

a) pre-extension, i.e. reaction of a compound XAV which has XH groups and is of the formula $R^2(XH)_n$ with a stoichiometric excess of a carboxyl-terminated butadiene/acrylonitrile copolymer CTBN of the formula HOOC—$R^1$—COOH to give a carboxyl-terminated polymer of the formula (II) as already described above, in such a way that the compound XAV having XH groups and HOOC—$R^1$—COOH are used in an amount relative to one another such that the ratio of COOH groups to XH groups [COOH]/[XH] is $\geq 2$;

where the compound XAV having XH groups and the carboxyl-terminated butadiene/acrylonitrile copolymer CTBN of the formula HOOC—$R^1$—COOH should be selected as already described above;

b) termination, i.e. reacting a carboxyl-terminated polymer of the formula (II) with a diglycidyl ether or with a diamine or with a (meth)acrylate-functional alcohol or with a glycidyl ether-functional (meth)acrylate in such a way that the diglycidyl ether or the diamine or the (meth)acrylate-functional alcohol or the glycidyl ether-functional (meth)acrylate and the carboxyl-terminated polymer of the formula (II) are used in an amount relative to one another which corresponds to one molecule of diglycidyl ether or diamine or (meth)acrylate-functional alcohol or glycidyl ether-functional (meth)acrylate per COOH group of a molecule of carboxyl-terminated polymer of the formula (II).

In formula (XV) here, $R^{10}$ is a divalent radical and $Q^1$ is an end group which is selected from the group consisting of the formulae (XVI), (XVI'), (XVI") and —$NH_2$.

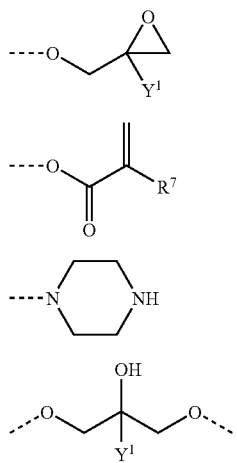

(XVI)

(XVI')

(XVI")

(XVII)

with the proviso that
Q is —NH— in the case
in which $Q^1$ is —$NH_2$ or the formula (XVI"), and
Q is —O— or the formula (XVII) in the case
in which $Q^1$ is the formula (XVI'), and
Q is the formula (XVII) in the case
in which $Q^1$ is the formula (XVI).

End group-terminated polymers of the formula (XV) are considered to be especially the above-described epoxy-terminated polymers of the formula (I), carboxyl-terminated polymers of the formula (II), amine-terminated polymers of the formula (XI), (XI') or (XI") and (meth)acrylate-terminated polymers of the formula (XII) or (XII').

The carboxyl-terminated polymers of the formula (II) thus prepared and end group-terminated polymers of the formula (XV) described, especially the epoxy-terminated polymers of the formula (I), amine-terminated polymers of the formula (XI), (XI') or (XI") and (meth)acrylate-terminated polymers of the formula (XII) or (XII'), can be used as a means of increasing the impact resistance of a polymer matrix and are usable as so-called impact modifiers.

The carboxyl-terminated polymers of the formula (II) and end group-terminated polymers of the formula (XV), especially epoxy-terminated polymers of the formula (I), amine-terminated polymers of the formula (XI), (XI') or (XI") and (meth)acrylate-terminated polymers of the formula (XII) or (XII'), are preferably liquid or viscous to highly viscous at room temperature. They are preferably processible by the customary means at least at a temperature of 60° C. Most preferably, they are pourable or at least of honeylike consistency at least at 60° C. If they are highly viscous or solid, they can optionally be dissolved, emulsified or dispersed in solvents or resins, such as liquid epoxy resins.

These polymers of the formulae (I), (II), (XI), (XI'), (XI"), (XII) and (XII') are preferably used in crosslinking compositions, especially in systems into which these polymers can be incorporated by reaction. The question as to the compositions in which these polymers are used thus depends especially on the polymer matrix. For instance, preference is given to using (meth)acrylate-terminated polymers of the formula (XII) or (XII') especially in (meth)acrylates or unsaturated polyester resins which crosslink to a polymer matrix by means of a free-radically initiated or UV light-initiated polymerization reaction.

Epoxy-terminated polymers of the formula (I) and carboxyl-terminated polymers of the formula (II) and amine-terminated polymers of the formula (XI), (XI') or (XI") are preferably used in epoxy resin compositions.

In the case of the epoxy-terminated polymers of the formula (I), they are preferably used in the component in which an epoxy resin A is present. The epoxy resin A may be a liquid epoxy resin of the formula (IX) or a solid epoxy resin of the formula (VIII). In one embodiment, the composition comprises, as well as an epoxy resin A, a hardener B for epoxy resins, which is activated by elevated temperature. Such compositions are used especially as heat-curing epoxy resin adhesives and cure in the course of heating to a temperature above the heat activation of the thermally activable hardener B, so as to form a cured composition.

In the case of the carboxyl-terminated polymers of the formula (II), they can likewise be used in the component in which an epoxy resin A is present.

In the case of the carboxyl-terminated polymers of the formula (II) or of the amine-terminated polymers of the formula (XI), (XI') or (XI"), they can, however, also be used in a hardener component. Such a hardener component comprises a hardener for epoxy resins, for example polyamines or polymercaptans. As a result of the mixing of the two components, they react with one another, especially also at room temperature, to form a cured composition.

Such compositions can be employed widely. Examples thereof are adhesives, sealants, coatings, foams, structural foams, paints, injection resins or coverings. They can be used, for example, in construction or civil engineering, in the manufacture or repair of industrial goods or consumer goods. They are especially preferably used as adhesives, especially for bodywork construction and the manufacture of windows, domestic appliances or modes of transport, such as water or land vehicles, preferably automobiles, buses, trucks, trains or ships; or as a sealant for sealing joints, seams or cavities in industrial manufacture or repair.

Especially preferably, such compositions are used as crash-resistant adhesives, especially for the construction of modes of transport, preferably in the OEM sector of construction of modes of transport.

Additionally preferably, such compositions are used as structural adhesives for construction and civil engineering, or as highly stressable industrial coatings.

EXAMPLES

Raw Materials Used

| | |
|---|---|
| Hycar ® CTBN 1300X13: | acid number = 32 mg/g KOH = 570 meq/kg |
| | Mw = approx. 3150 g/mol |
| D.E.R. 331 (bisphenol A diglycidyl ether = "BADGE"): | 5.40 eq/kg |
| | Mw = approx. 185 g/eq |
| Epilox F-17-00 (bisphenol F diglycidyl ether = "BFDGE"): | 5.88 eq/kg |
| | Mw = approx. 170 g/eq |
| 1,6-Hexanedithiol: | Mw = 150.31 g/mol |
| 1,6-Decanediamine: | Mw = 116.2 g/mol |
| Bisphenol A: | Mw = 228.3 g/mol |

Preparation of Carboxyl-Terminated Polymers

Pre-Extended with Hexanedithiol ("CTBN-HDT-CTBN")

300.0 g (171 meq of COOH) of carboxyl-terminated acrylonitrile/butadiene copolymer (Hycar® CTBN 1300X13), 3.22 g of 1,6-hexane-dithiol (42.8 meq of SH) and 1.0 g of p-toluenesulfonic acid monohydrate (5.3 meq) were weighed into a flanged flask with stirrer, nitrogen inlet and vacuum connection. The mixture was stirred to constant weight under gentle vacuum at 150° C. over 4 h. A viscous mass was thus obtained with an acid number of about 24.6 mg/g KOH (approx. 439 meq/kg). The catalyst was not neutralized. The product thus obtained was designated CTBN1.

Pre-Extended with Hexanediamine ("CTBN-HDA-CTBN")

300.0 g (171 meq of COOH) of carboxyl-terminated acrylonitrile/butadiene copolymer (Hycar CTBN 1300X13), 1.76 g of 1,6-hexane-diamine (28.5 meq of NH2) and 3.0 g of n-butyl titanate were weighed into a flanged flask with stirrer, nitrogen inlet and vacuum connection. The mixture was stirred under gentle vacuum to constant weight at 180° C. over 4 h. A viscous mass was thus obtained with an acid number of about 26.2 mg/g KOH (approx. 468 meq/kg). The product thus obtained was designated CTBN2.

Preparation of Epoxy-Terminated Polymers

Terminated with BFDGE ("BFDGE-CTBN-HDT-CTBN-BFDGE")

100.0 g (approx. 42.2 meq of COOH) of CTBN1 and 150.0 g (882 meq of epoxy) of Epilox F 17-00 were weighed into a flanged flask with stirrer, nitrogen inlet and vacuum connection. The mixture was stirred under gentle vacuum at 180° C. over 3 h until a viscous epoxy resin with an epoxide content of approx. 3.35 eq/kg was obtained. The product thus obtained was designated ETBN1.

Terminated with BADGE ("BADGE-CTBN-HDA-CTBN-BADGE")

100.0 g (approx. 46.8 meq of COOH) of CTBN2 and 150.0 g (810 meq of EP) of D.E.R. 331 were weighed into a flanged flask with stirrer, nitrogen inlet and vacuum connection. The mixture was stirred under gentle vacuum at 180° C. over 3 h until a viscous epoxy resin with an epoxide content of approx. 3.05 eq/kg was obtained. The product thus obtained was designated ETBN2.

ETBN1 Post-Extended with Bisphenol A ("BFDGE-CTBN-HDT-CTBN-BFDGE-BPA-BFDGE-CTBN-HDT-CTBN-BFDGE")

150.0 g (approx. 503 meq of epoxy) of ETBN1 and 7.5 g (approx. 66 meq of OH) of bisphenol A were weighed into a flanged flask with stirrer, nitrogen inlet and vacuum connection. The mixture was stirred under gentle vacuum at 180° C. over 3 h until a viscous epoxy resin with an epoxide content of approx. 2.77 eq/kg was obtained. The product thus obtained was designated ETBN3.

BADGE-Terminated CTBN (Comparison) ("BADGE-CTBN-BADGE")

100.0 g (approx. 57 meq of COOH) of carboxyl-terminated acrylonitrile/butadiene copolymer (Hycar® CTBN 1300X13) and 150.0 g (810 meq of EP) of D.E.R. 331 were weighed into a flanged flask with stirrer, nitrogen inlet and vacuum connection. The mixture was stirred under gentle vacuum at 180° C. over 3 h until a viscous epoxy resin with an epoxide content of approx. 2.99 eq/kg was obtained. The product thus obtained was designated Ref.ETBN.

Efficacy as Impact Modifiers

The epoxy-terminated polymers ETBN1, ETBN2 and ETBN3 exhibited, in heat-curing epoxy resin adhesives, a marked increase in impact resistance compared to the comparative polymer Ref.ETBN.

Illustrative Compositions

The adhesive compositions Z1, Z2, Z3 and the comparative composition ZRef1 according to table 1 were prepared as follows:

A planetary mixer is initially charged with all components apart from dicyandiamide and stirred at 90-100° C. under reduced pressure for one hour, then dicyandiamide is added and, after stirring for a further 10 minutes, the mixtures is transferred to cartridges.

Preparation of a PU Prepolymer PUPrep 150 g of Poly-THF 2000 (BASF, OH number 57 mg/g KOH) and 150 Liquiflex H (Krahn, hydroxyl-terminated polybutadiene, OH number 46 mg/g KOH) were dried at 105° C. under reduced pressure for 30 minutes. Once the temperature had been reduced to 90° C., 61.5 g of isophorone diisocyanate and 0.14 g of dibutyltin dilaurate were added. The reaction was conducted at 90° C. under reduced pressure until the NCO content had become constant at 3.10% after 2.0 h (calculated NCO content: 3.15%). Subsequently, 96.1 g of cardanol (Cardolite NC-700, Cardolite) were added as a blocking agent. The mixture was stirred further at 105° C. under reduced pressure until the NCO content had fallen below 0.1% after 3.5 h. The product was used thus as PUPrep.

Test Methods:

Tensile Strength (TS) (DIN EN ISO 527)

A sample of the composition was pressed to a layer thickness of 2 mm between two Teflon papers. Subsequently, the composition was cured at 180° C. over 30 minutes. The Teflon papers were removed and the specimens were punched according to the DIN standard in the hot state. After storage for 1 day, the test specimens were analyzed under standard climatic conditions with a pulling speed of 2 mm/min.

The tensile strength ("TS") was determined to DIN EN ISO 527.

Dynamic Resistance to Cleavage (ISO 11343)

The specimens were produced from the compositions described and with electrolytically galvanized DC04 steel (eloZn) with the dimensions 90×20 x 0.8 mm; the adhesive area was 20×30 mm at a layer thickness of 0.3 mm. Curing was effected at 180° C. for 30 min. The dynamic resistance to cleavage was measured in each case at room temperature and at minus 30° C. The impact speed was 2 m/s. The fracture energy (FE) in Joules reported is the area under the measurement curve (from 25% to 90%, to ISO 11343).

TABLE 1

Compositions comprising impact modifiers and test results.

| | ZRef1 | Z1 | Z2 | Z3 |
|---|---|---|---|---|
| Araldite ® GT 7071 [PW*] | 9 | 9 | 9 | 9 |
| BADGE [PW*] | 26 | 26 | 26 | 26 |
| Polypox R7 (tert-butylphenyl glycidyl ether, UPPC) [PW*] | 3.0 | 3.0 | 3.0 | 3.0 |
| Ref. ETBN [PW*] | 15.0 | | | |
| ETBN1 [PW*] | | 15.0 | | |
| ETBN2 [PW*] | | | 15.0 | |
| ETBN3 [PW*] | | | | 15.0 |
| PUPrep [PW*] | 15.0 | 15.0 | 15.0 | 15.0 |
| Dicyandiamide [PW*] | 3.2 | 3.2 | 3.2 | 3.2 |
| Aerosil ® R 202 (Degussa) [PW*] | 7.0 | 7.0 | 7.0 | 7.0 |
| Filler mixture [PW*] | 13.0 | 13.0 | 13.0 | 13.0 |
| ZF [MPa] | 31.9 | 35.1 | 32.5 | 35.8 |
| FE at 23° C. [J] | 17.2 | 19.1 | 18.7 | 18.4 |
| FE at −30° C. [J] | 4.4 | 7.1 | 7.3 | 5.5 |

*PW = parts by weight.

The invention claimed is:

1. An epoxy-terminated polymer of the formula (I)

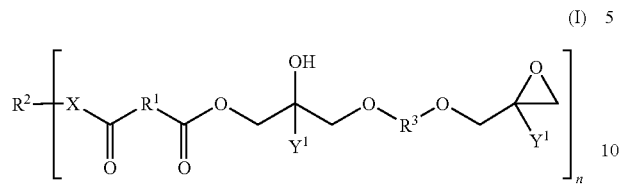

where $R^1$ is a divalent radical of a carboxyl-terminated butadiene/acrylonitrile copolymer CTBN after removal of the terminal carboxyl groups;
$R^2$ is a radical of a compound XAV which has n XH groups and is selected from the group consisting of polyamines, polymercaptans, (poly)aminoalcohols, (poly)mercaptoalcohols and (poly)aminomercaptans, after removal of n XH groups;
$R^3$ is a diglycidyl ether DGE after removal of the two glycidyl ether groups;
$Y^1$ is H or methyl;
X is independently S, NH or $NR^0$ or O, with the proviso that only one X in the molecule is O, where $R^0$ is an alkyl, cycloalkyl or aryl radical having 1 to 8 carbon atoms or a divalent radical, which is joined to $R^2$;
and n is 2 to 4.

2. The epoxy-terminated polymer as claimed in claim 1, wherein $R^1$ has the formula (IV)

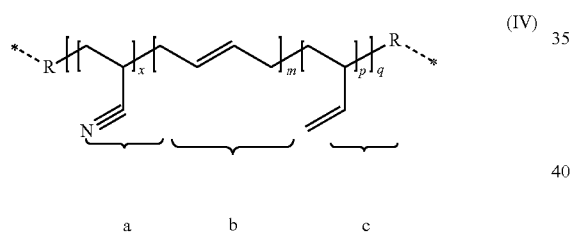

where the broken lines represent the attachment sites of the two carboxyl groups; b and c are the structural elements which originate from butadiene, and a is the structural element which originates from acrylonitrile; R is a linear or branched alkylene radical having 1 to 6 carbon atoms, which is optionally substituted by unsaturated groups; q is 40 to 100; x=0.05–0.3, m=0.5–0.8, p=0.1–0.2; with the proviso that x+m+p=1.

3. The epoxy-terminated polymer as claimed in claim 1, wherein $R^2$ is a divalent aliphatic, cycloaliphatic or aromatic organic radical which optionally has oxygen, nitrogen or sulfur atoms.

4. The epoxy-terminated polymer as claimed in claim 1, wherein the compound XAV having XH groups is a polyoxyalkylenepolyamine with two or three amino groups, of the formula (V')

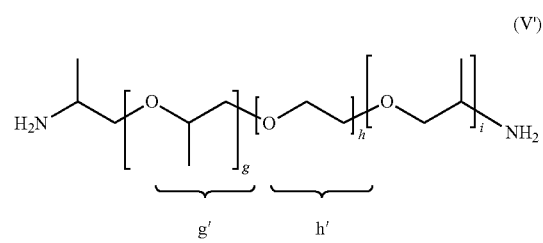

where g' is the structural element which originates from propylene oxide, and h' is the structural element which originates from ethylene oxide, and g, h and i are each 0 to 40, with the proviso that the sum of g, h and i is $\geq 1$.

5. The epoxy-terminated polymer as claimed in claim 1, wherein the compound XAV having XH groups is a polymercaptan, of the formula (V")

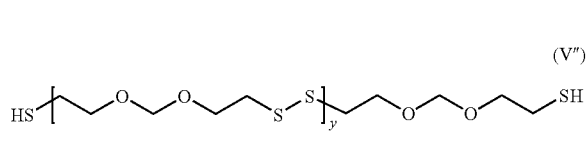

where y is 1 to 45.

6. The epoxy-terminated polymer as claimed in claim 1, wherein $R^3$ has the formula (VI) or (VI')

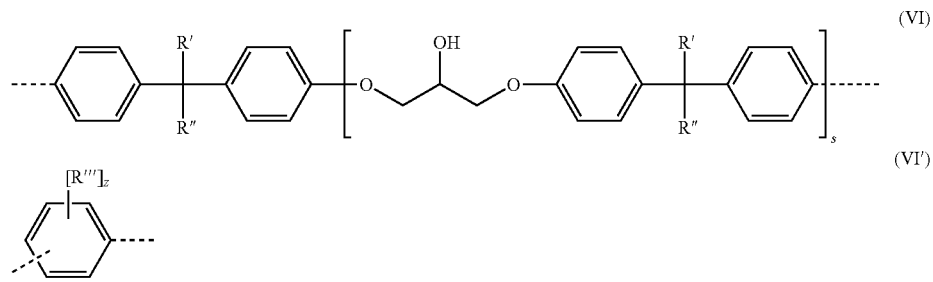

where $R^{40}$, R" and R'" are each independently H, methyl or ethyl, z is 0 or 1 and s is 0 or 0.1-12.

7. The epoxy-terminated polymer as claimed in claim 1, wherein the diglycidyl ether DGE is bisphenol F diglycidyl ether.

8. The epoxy-terminated polymer as claimed in claim 1, wherein the diglycidyl ether DGE is an aliphatic or cycloaliphatic diglycidyl ether, of the formula (VI") or (VI'")

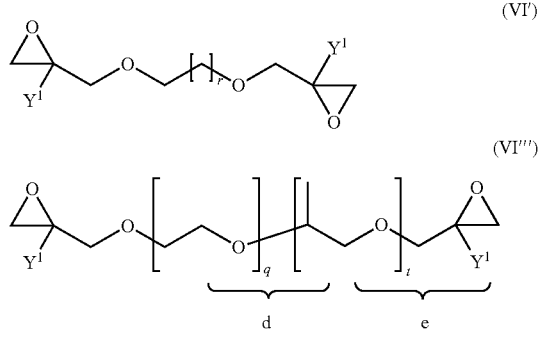

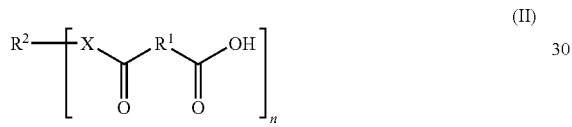

where r is 1 to 9 and
d is the structural element which originates from ethylene oxide, and e is the structural element which originates from propylene oxide;
q is 0 to 10 and t is 0 to 10, with the proviso that the sum of q and t is $\geq 1$.

9. The epoxy-terminated polymer as claimed in claim 8, wherein the diglycidyl ether DGE is ethylene glycol diglycidyl ether, butanediol diglycidyl ether or hexanediol diglycidyl ether.

10. A carboxyl-terminated polymer of the formula (II)

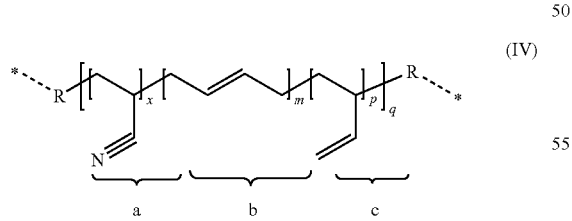

where $R^1$ is a divalent radical of a carboxyl-terminated butadiene/acrylonitrile copolymer CTBN after removal of the terminal carboxyl groups;
$R^2$ is a radical of a compound XAV which has n XH groups and is selected from the group consisting of polyamines, polymercaptans, (poly)aminoalcohols, (poly)mercaptoalcohols and (poly)aminomercaptans, after removal of n XH groups;
X is independently S, NH or $NR^0$ or O, with the proviso that only one X in the molecule is O, where $R^0$ is an alkyl, cycloalkyl or aryl radical having 1 to 8 carbon atoms or a divalent radical, which is joined to $R^2$;
n is 2 to 4.

11. The carboxyl-terminated polymer as claimed in claim 10, wherein $R^1$ has the formula (IV)

(IV)

*⋯R─[⎯]_x─[⎯]_m─[⎯]_p⎯]_q─R⋯* where the broken lines represent the attachment sites of the two carboxyl groups;
b and c are the structural elements which originate from butadiene, and a is the structural element which originates from acrylonitrile;
R is a linear or branched alkylene radical having 1 to 6 carbon atoms, which is optionally substituted by unsaturated groups;
q is 40 to 100;
x=0.05-0.3, m=0.5-0.8, p=0.1-0.2;
with the proviso that x+m+p=1.

12. An amine-terminated polymer of the formula (XI) or (XI') or (XI")

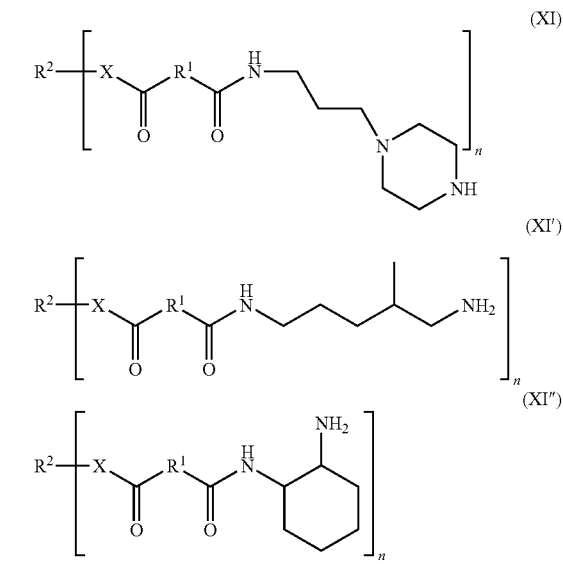

where $R^1$ is a divalent radical of a carboxyl-terminated butadiene/acrylonitrile copolymer CTBN after removal of the terminal carboxyl groups;
$R^2$ is a radical of a compound XAV which has n XH groups and is selected from the group consisting of polyamines, polymercaptans, (poly)aminoalcohols, (poly)mercaptoalcohols and (poly)aminomercaptans, after removal of n XH groups;
X is independently S, NH or $NR^0$ or O, with the proviso that only one X in the molecule is O, where $R^0$ is an alkyl, cycloalkyl or aryl radical having 1 to 8 carbon atoms or a divalent radical, which is joined to $R^2$;
and n is 2 to 4.

13. A (meth)acrylate-terminated polymer of the formula (XII) or (XII')

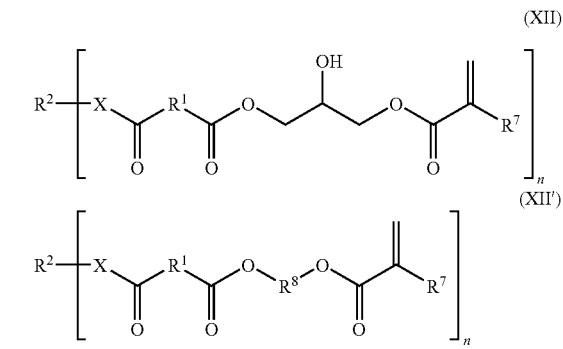

where $R^1$ is a divalent radical of a carboxyl-terminated butadiene/acrylonitrile copolymer CTBN after removal of the terminal carboxyl groups;
$R^2$ is a radical of a compound XAV which has n XH groups and is selected from the group consisting of polyamines, polymercaptans, (poly)aminoalcohols, (poly)mercaptoalcohols and (poly)aminomercaptans, after removal of n XH groups;

X is independently S, NH or $NR^0$ or O, with the proviso that only one X in the molecule is O, where $R^0$ is an alkyl, cycloalkyl or aryl radical having 1 to 8 carbon atoms or a divalent radical, especially alkylene radical, which is joined to $R^2$;

$R^7$ is H or methyl;

$R^8$ is a divalent radical, and n is 2 to 4.

14. A process for preparing a carboxyl-terminated polymer as claimed in claim 10 by a reaction of a compound XAV having XH groups of the formula $R^2(XH)_n$ with a carboxyl-terminated butadiene/acrylonitrile copolymer CTBN of the formula $HOOC-R^1-COOH$, wherein $R^2(XH)_n$ and $HOOC-R^1-COOH$ are used for this reaction in an amount relative to one another which corresponds to a stoichiometric ratio of the COOH groups to XH groups [COOH]/[XH] of $\geq 2$.

15. A process for preparing an epoxy-terminated polymer as claimed in claim 1 by a reaction of a carboxyl-terminated polymer of the formula (II) with a diglycidyl ether of the formula (III), wherein the polymer of the formula (II) and the diglycidyl ether of the formula (III) are used for this reaction in an amount relative to one another which corresponds to a stoichiometric ratio of the glycidyl ether groups to COOH groups

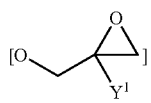

/[COOH] of $\geq 2$

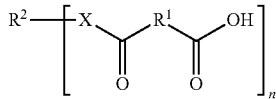 (II)

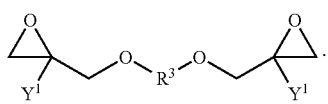 (III)

16. A process for preparing an end group-terminated polymer of the formula (XV)

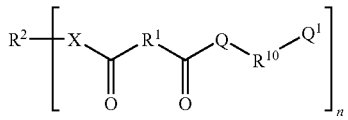 (XV)

comprising the following two steps:

a) pre-extension, i.e. reaction of a compound XAV which has XH groups and is of the formula $R^2(XH)_n$ with a stoichiometric excess of a carboxyl-terminated butadiene/acrylonitrile copolymer CTBN of the formula $HOOC-R^1-COOH$ to give a carboxyl-terminated polymer of the formula (II) as claimed in claim 10, in such a way that the compound XAV having XH groups and $HOOC-R^1-COOH$ are used in an amount relative to one another such that the ratio of COOH groups to XH groups [COOH]/[XH] is $\geq 2$;

b) termination, i.e. reacting a carboxyl-terminated polymer of the formula (II) with a diglycidyl ether or with a diamine or with a (meth)acrylate-functional alcohol or with a glycidyl ether-functional (meth)acrylate in such a way that the diglycidyl ether or the diamine or the (meth)acrylate-functional alcohol or the glycidyl ether-functional (meth)acrylate and the carboxyl-terminated polymer of the formula (II) are used in an amount relative to one another which corresponds to one molecule of diglycidyl ether or diamine or (meth)acrylate-functional alcohol or glycidyl ether-functional (meth)acrylate per COOH group of a molecule of carboxyl-terminated polymer of the formula (II);

where, in formula (XV), $R^{10}$ is a divalent radical and $Q^1$ is an end group which is selected from the group consisting of the formulae (XVI), (XVI'), (XVI") and $-NH_2$

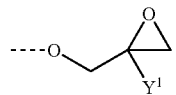 (XVI)

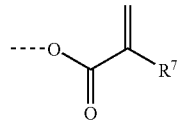 (XVI')

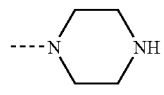 (XVI")

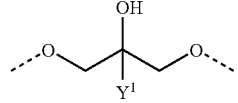 (XVII)

with the proviso that

Q is $-NH-$ in the case in which $Q^1$ is $-NH_2$ or the formula (XVI"), and

Q is $-O-$ or the formula (XVII) in the case in which $Q^1$ is the formula (XVI'), and Q is the formula (XVII) in the case in which $Q^1$ is the formula (XVI).

17. A polymer matrix comprising a carboxyl-terminated polymer of the formula (II) as claimed in claim 10, an end group-terminated polymer of the formula (XV),

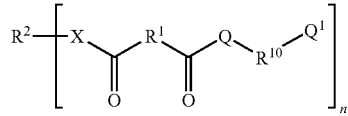 (XV)

where, in formula (XV), $R^{10}$ is a divalent radical and $Q^1$ is an end group which is selected from the group consisting of the formulae (XVI), (XVI'), (XVI") and $-NH_2$

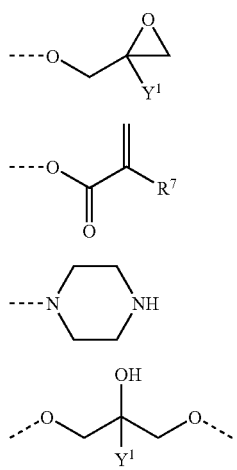

(XVI)

(XVI')

(XVI'')

(XVII)

with the proviso that
Q is —NH— in the case
in which $Q^1$ is —NH$_2$ or the formula (XVI''), and
Q is —O— or the formula (XVII) in the case
in which $Q^1$ is the formula (XVI'), and
Q is the formula (XVII) in the case,
as a means of increasing the impact resistance of the polymer matrix.

18. The polymer matrix as claimed in claim 17, wherein the polymer matrix is an epoxy resin matrix.

19. A composition comprising an amine-terminated polymer of the formula (XI) or (XI') or (XI'') as claimed in claim 12 or a (meth)acrylate-terminated polymer of the formula (XII) or (XII')

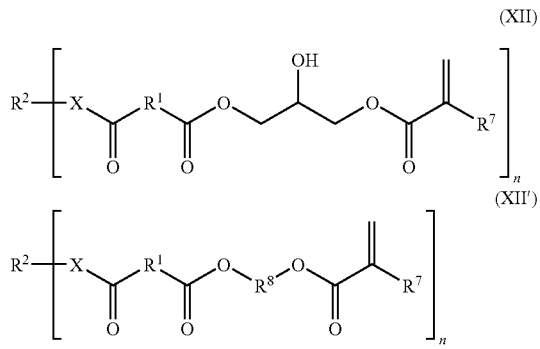

where $R^1$ is a divalent radical of a carboxyl-terminated butadiene/acrylonitrile copolymer CTBN after removal of the terminal carboxyl groups;
$R^2$ is a radical of a compound XAV which has n XH groups and is selected from the group consisting of polyamines, polymercaptans, (poly)aminoalcohols, (poly)mercaptoalcohols and (poly)aminomercaptans, after removal of n XH groups;
X is independently S, NH or NR$^0$ or O, with the proviso that only one X in the molecule is O, where R$^0$ is an alkyl, cycloalkyl or aryl radical having 1 to 8 carbon atoms or a divalent radical, which is joined to R$^2$;
$R^7$ is H or methyl;
$R^8$ is a divalent radical, and
n is 2 to 4.

20. A composition comprising an epoxy-terminated polymer of the formula (I) as claimed in claim 1 or a carboxyl-terminated polymer of the formula (II)

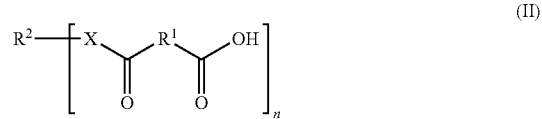

where $R^1$ is a divalent radical of a carboxyl-terminated butadiene/acrylonitrile copolymer CTBN after removal of the terminal carboxyl groups;
$R^2$ is a radical of a compound XAV which has n XH groups and is selected from the group consisting of polyamines, polymercaptans, (poly)aminoalcohols, (poly)mercaptoalcohols and (poly)aminomercaptans, after removal of n XH groups;
X is independently S, NH or NR$^0$ or O, with the proviso that only one X in the molecule is O, where R$^0$ is an alkyl, cycloalkyl or aryl radical having 1 to 8 carbon atoms or a divalent radical, which is joined to R$^2$;
n is 2 to 4.

21. The composition as claimed in claim 20, wherein the composition further comprises at least one epoxy resin A.

22. The composition as claimed in claim 21, wherein the composition further comprises a hardener B for epoxy resins, which is activated by elevated temperature.

23. A cured composition obtained from a composition as claimed in claim 21 and an addition of a hardener for epoxy resins.

24. A cured composition obtained from heating a composition as claimed in claim 22 to a temperature above the heat activation of the thermally activable hardener B.

* * * * *